May 8, 1934.  E. H. MORGAN  1,958,279
FILTER
Filed Sept. 25, 1929  4 Sheets-Sheet 1
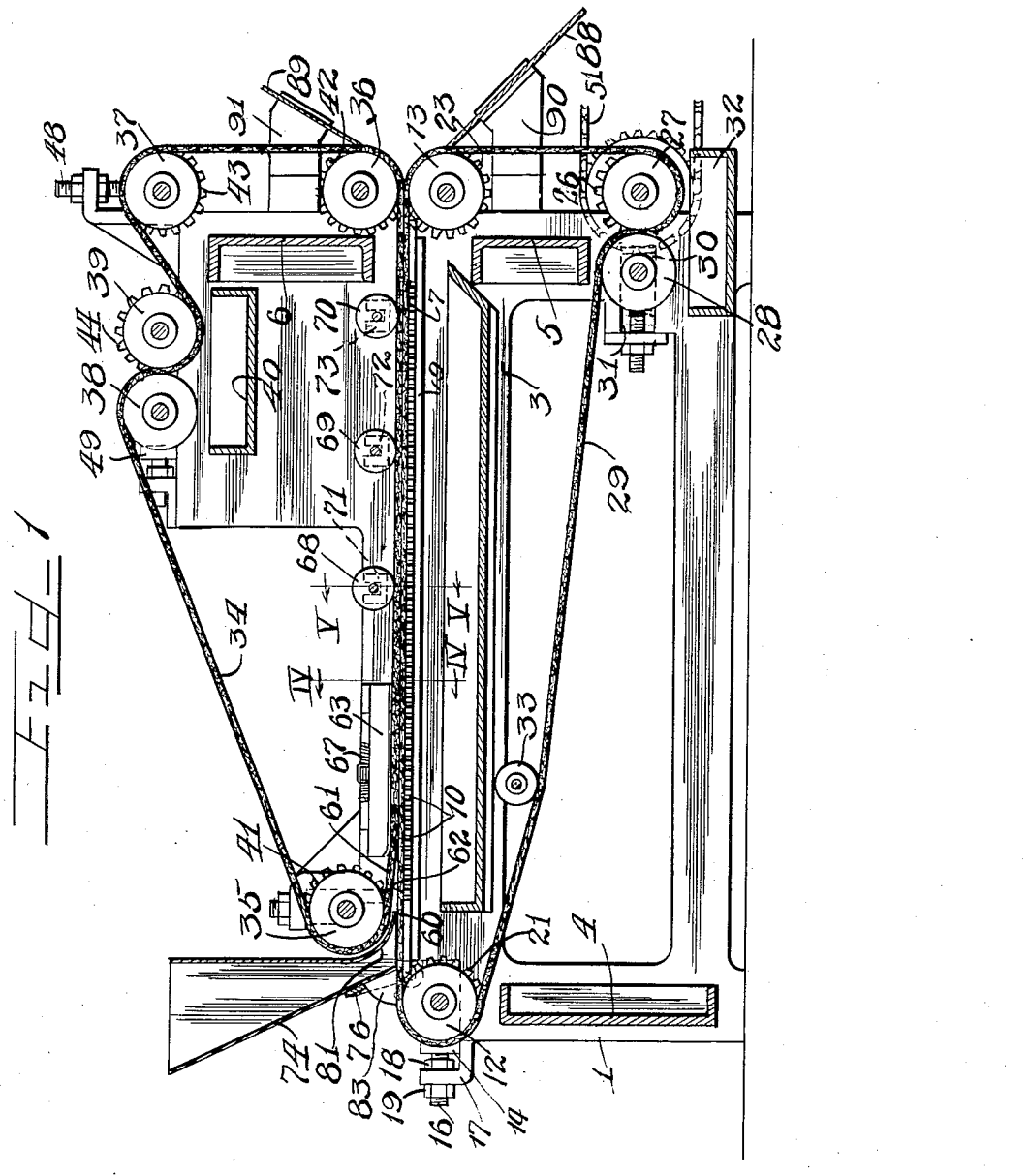
Inventor
Everette H Morgan
by Charles M Hills
Attys.

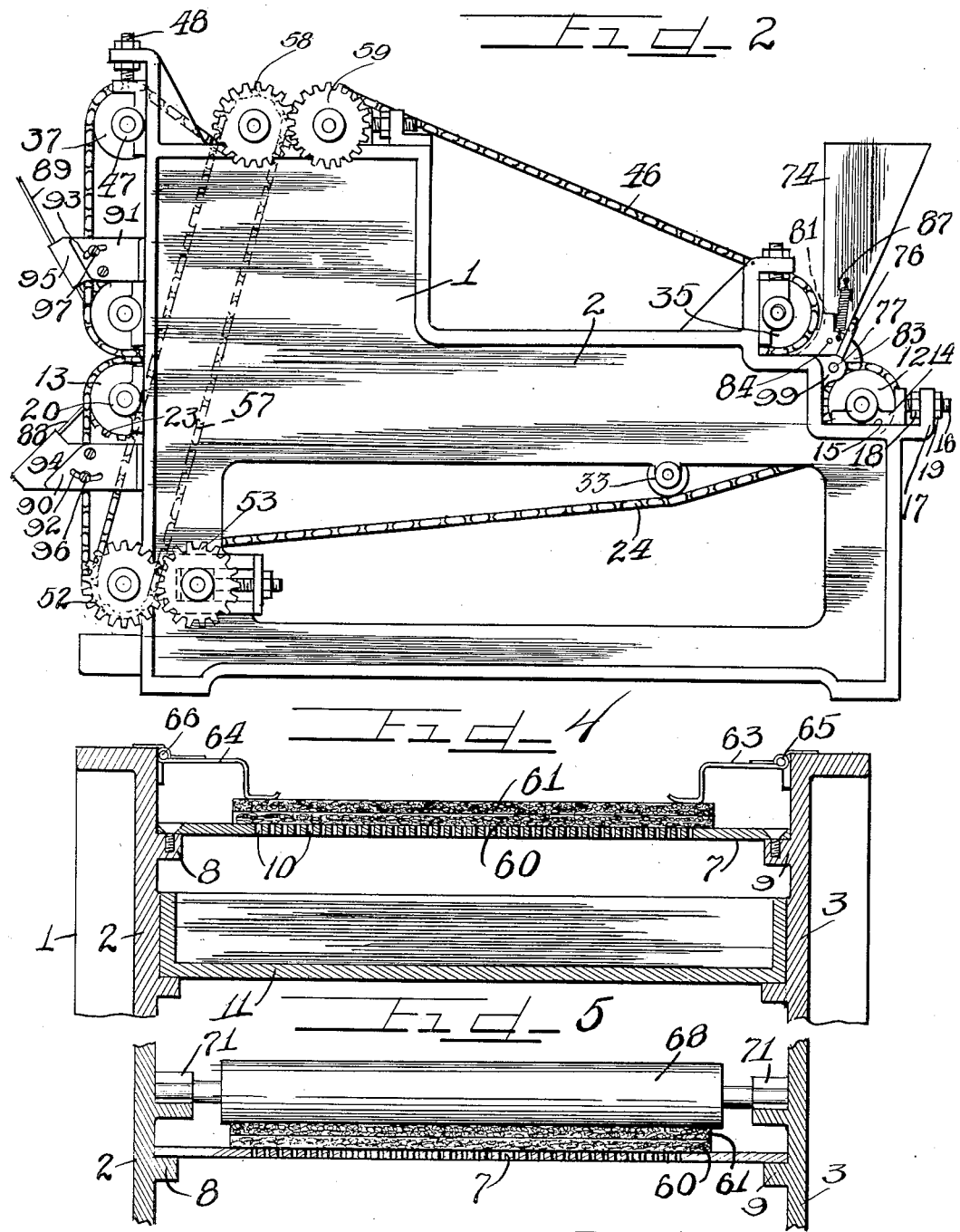

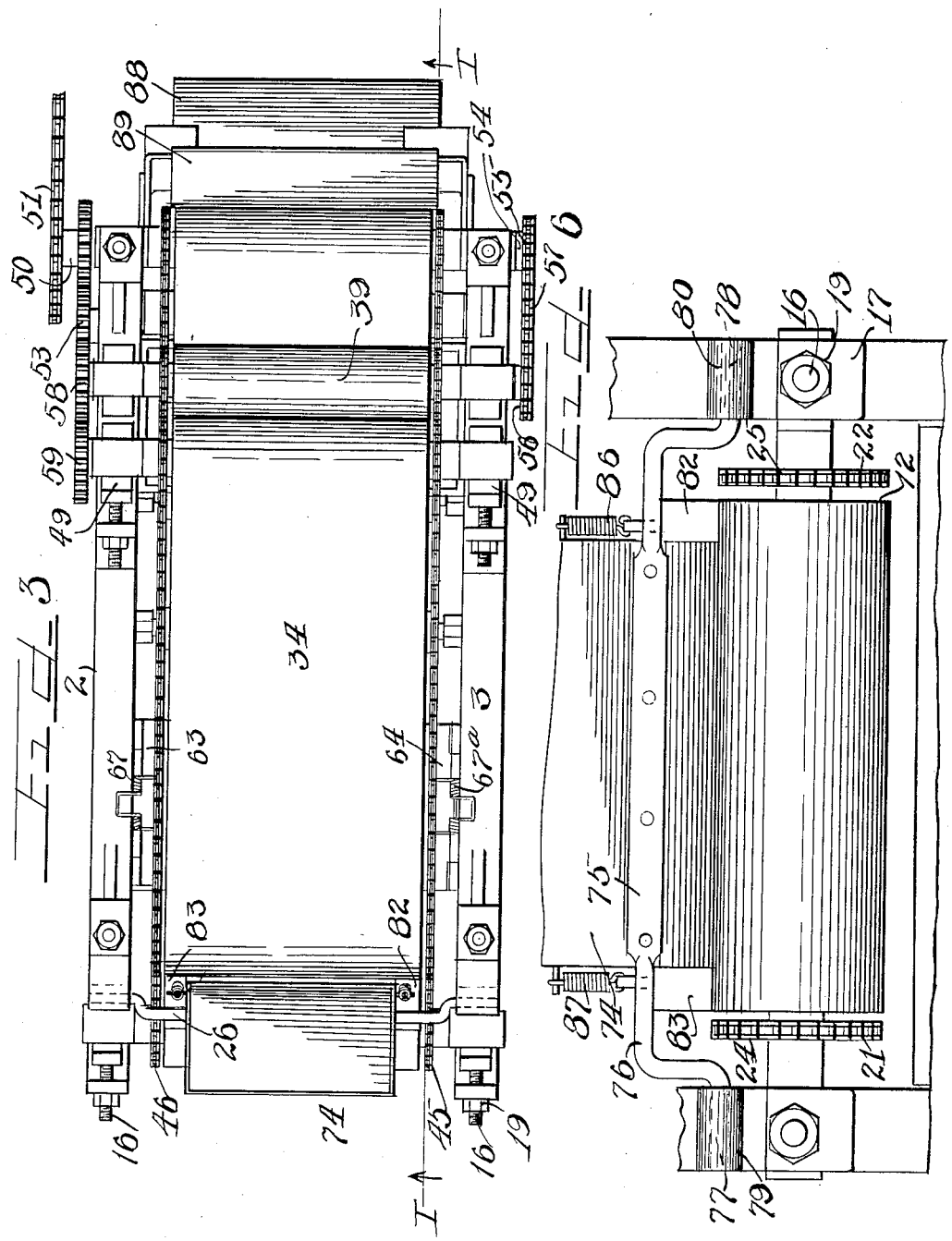

May 8, 1934.  E. H. MORGAN  1,958,279
FILTER
Filed Sept. 25, 1929   4 Sheets-Sheet 4
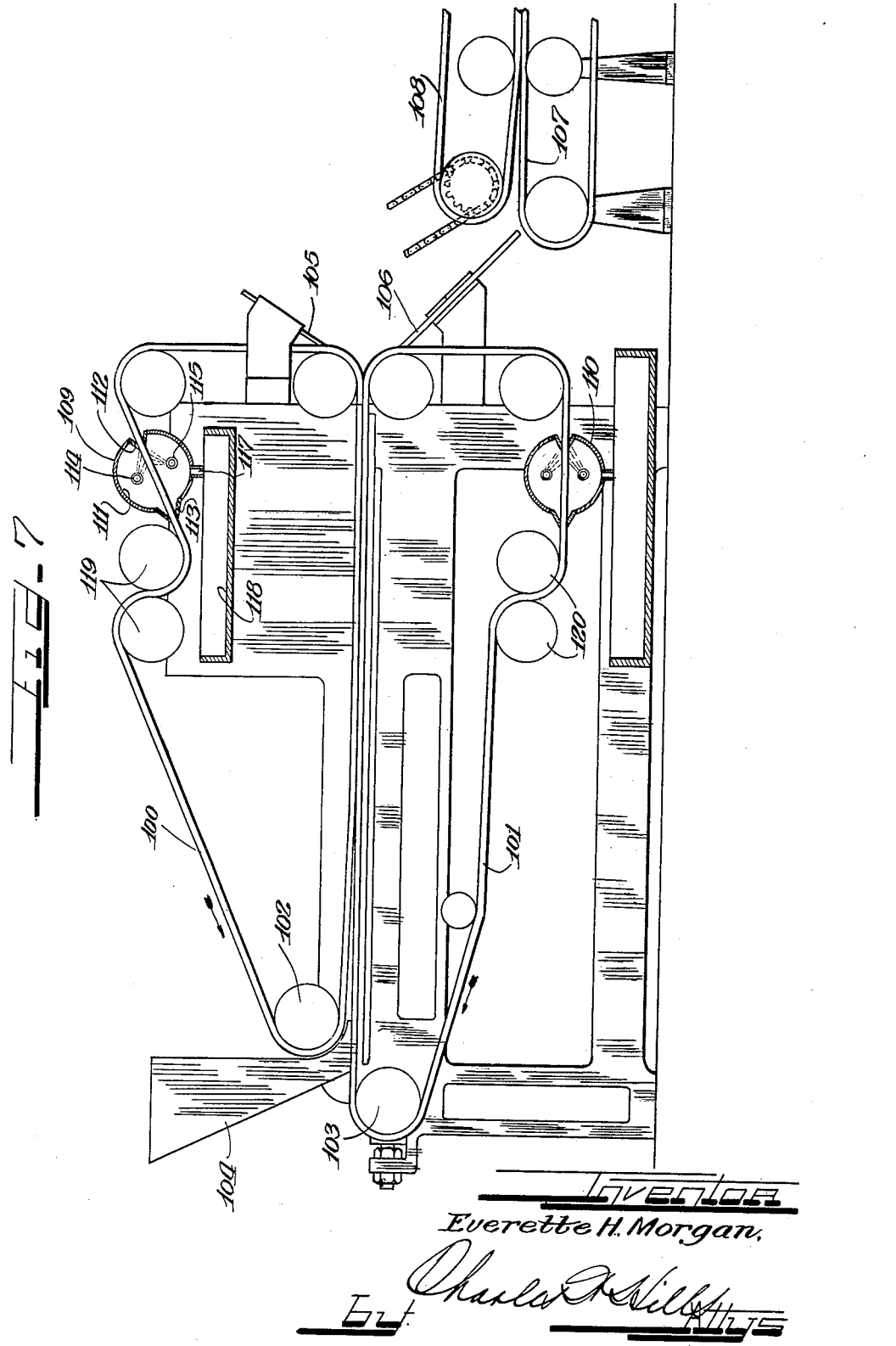
Inventor
Everette H. Morgan,
By Charles...
Attys Patented May 8, 1934

1,958,279

UNITED STATES PATENT OFFICE 1,958,279

FILTER

Everette H. Morgan, Oak Park, Ill.

Application September 25, 1929, Serial No. 394,963

3 Claims. (Cl. 100—35)

This invention relates to a filter for use particularly in connection with the recovery of solids by filtration of sewage sludges known to those skilled in the art of sewage treatment as either activated or Imhoff sludge. The invention, however, is not necessarily limited or restricted to the sewage art.

As is well known, it is very difficult to filter these types of materials owing to their tenacity for their mother liquors and to their colloidal behavior. I have found, however, that sewage sludges can be filtered by traveling bands of absorbent material.

It is therefore an object of this invention to provide an improved apparatus for filtering sewage sludge in a continuous manner and with a minimum requirement of power and of manual attention.

It is a further important object of this invention to provide an apparatus for continuously filtering sewage sludges of the maximum concentration obtainable by settling only.

It is a further important object of this invention to provide an apparatus for continuously filtering sewage sludges by means of bands of absorbent material and to provide means for washing said bands without interfering with the operation of the apparatus.

Other and further important objects of this invention will be apparent from the disclosures in the specification and the accompanying drawings.

This invention (in a preferred form) is illustrated in the drawings and hereinafter more fully described.

On the drawings:

Figure 1 is a longitudinal sectional view of an apparatus embodying the priniciples of my invention.

Figure 2 is a side elevational view of my apparatus.

Figure 3 is a top plan view.

Figure 4 is an enlarged sectional view taken substantially on line IV—IV of Figure 1.

Figure 5 is an enlarged sectional view taken substantially on line V—V of Figure 1, with parts in elevation.

Figure 6 is an enlarged end elevational fragmentary view.

Figure 7 is a longitudinal sectional view of a modified form of my apparatus.

As shown on the drawings:

The reference numeral 1 indicates the frame of a filtering apparatus embodying the principles of my invention. Said supporting frame 1 comprises side members 2 and 3 suitably held together by transverse channel beams 4, 5 and 6. A horizontal supporting member 7, extending substantially the full length of the frame, is supported from said side members 2 and 3 upon longitudinally extending ribs 8 and 9, respectively. Said supporting member 7 is provided with a plurality of apertures 10, through which liquids may drain, as will later be explained, into a trough 11 placed therebeneath.

A pair of rolls 12 and 13 are journaled, respectively, at the feed and discharge ends of the frame 1 in the side frame members 2 and 3. The journals of the roll 12 are supported in bearing blocks 14 slidably mounted in guideways 15 and adjustable therein by means of bolts 16. Said bolts 16 extend through lugs 17 formed upon said frame 1 and are loosely secured at their inner ends to the bearing blocks 14. Nuts 18 and 19 threaded upon the bolts 16 serve to hold the bearing blocks 14 in their adjusted positions. The roll 13 is journaled in stationary bearings 20 secured to the rear faces of the side members 2 and 3. Both of the rolls 12 and 13 are so positioned that their upper surfaces are substantially flush with the upper surface of the horizontal supporting member 7. Sprocket wheels 21 and 22 are mounted upon the shaft of the roll 12 at each end of the cylindrical roll portion and similar sprocket wheels 23 are mounted upon the shaft of the roll 13. Sprocket chains 24 and 25 are trained around the sprocket wheels 21 and 22, respectively, and also around the sprocket wheels 23. Said sprocket chains 24 and 25 are likewise trained around sprocket gears 26 mounted upon the shaft of a roller 27, and over a second roller 28. Said rollers 27 and 28 together comprise squeeze rolls for squeezing the moisture out of an endless band 29 of porous, absorbent material. For this purpose, the squeeze roll 28 is mounted in adjustable bearing blocks 30 in guideways 31. A pan 32 is mounted beneath the squeeze rolls 27 and 28 to catch the liquids that may be squeezed from the porous band 29. An idling roller 33 serves to guide the return run of the porous band 29.

A similar porous band 34 is trained around rollers 35, 36 and 37 mounted transversely in the upper portion of the frame 1 and likewise between squeeze rolls 38 and 39 mounted above a drain pan 40. The rolls 35, 36, 37 and 39 are provided with sprocket wheels 41, 42, 43 and 44, respectively, around which are trained endless sprocket chains 45 and 46. The roll 37 is mounted in bearing blocks 47 adjustable by means of the bolts 48 along the rear face of the side frame members 2 and 3. The squeeze roll 38 is likewise provided with adjustable bearing blocks 49 for varying the pressure upon the porous band 34 passing between said squeeze rolls 38 and 39.

The shaft of the roll 27 is extended as at 50, and said roll 27 is adapted to be driven by any suitable means, such as by a chain and sprocket 51 (Figure 3). A spur gear 52, also mounted upon the extended shaft of the roll 27, meshes with a second spur gear 53 on the extended end of the shaft of the roll 28, and thereby effects rotation of said roll 28 when the roll 27 is driven. The other end of the shaft of the roll 27 is likewise extended as at 54 and provided with a sprocket gear 55, from which a sprocket gear 56, mounted upon the extended end of the roll 39, is adapted to be driven by means of a sprocket chain 57. On the opposite extended end of the roll 39 is mounted a spur gear 58 adapted to mesh with a spur gear 59 mounted upon the corresponding extended end of the roll 38. The two sets of squeeze rolls 27 and 28 and 38 and 39 are thus positively driven and the remaining rolls are driven therefrom by the sprocket chains 24 and 25.

The horizontal runs, 60 and 61, of the porous bands 29 and 34, respectively, are first brought together as at 62 while supported upon the horizontal member 7 and travel the length of said member in superimposed relation. Hinged shoes 63 and 64 press against the upper surfaces of the porous band 34 to hold the margins of said bands 34 and 29 together during their passage over the perforated plate 7. Said shoes 63 and 64 are hinged as at 65 and 66, respectively, from the top edges of the side frames 2 and 3 and said hinges are provided with springs 67 and 67a for effecting a slight resilient pressure between the surfaces of said shoes and the upper surface of the porous band 34.

The horizontal portions 60 and 61 of the porous bands 29 and 34, respectively, are also slightly compressed by means of a plurality of compression rollers 68, 69 and 70 mounted in open bearings 71, 72 and 73, respectively, above the supporting member 7. Said rollers 68, 69 and 70 bear with their own weight against the upper surface of the horizontal portion 61 of the porous band 34 and serve to express liquid from the sewage sludge contained between said band portions 60 and 61.

The sewage sludge is fed onto the porous band 29 by means of a hopper 74 which may suitably be secured to the intermediate portion 75 of a yoke 76 having offset ends 77 and 78 mounted in bearings 79 and 80, respectively. As thus mounted, the hopper 74 is unbalanced, so that its lower arcuate wall 81 tends to hug closely the contour of the roll 35. Sewage sludge charged into the hopper 74 thus flows out of the open bottom of said hopper directly upon the porous band 29 and between the horizontal portions 60 and 61 of said porous bands 29 and 34, respectively. Lips 82 and 83 are provided on each side of the bottom of the hopper 74 to prevent lateral flow of the sewage sludge over the sides of the porous band 29. Said lips 82 and 83 are pivoted as at 84 to the sides of the hopper 74 and are provided with tension springs 86 and 87 tending to hold said lips against the surface of the porous band 29.

In operation, the sewage sludge, which may be sludge obtained by bacterial fixation or remaining after bacterial digestion, that is either activated or Imhoff sludge, and having a solid content of 4 to 5%, or greater if obtainable, is introduced into the hopper 74. The sludge discharges through the open bottom of said hopper 74 onto the top surface of the porous band 29. The travel of the band 29 carries the sludge between the horizontal portions 60 and 61 of said bands 29 and 34, respectively. Each of said bands is preferably formed of some relatively thick, absorbent material, such as felt or the like. The liquid of the sludge is accordingly absorbed by capillary action into the body of the bands 29 and 34, the edges of which are held together by the resiliently pressed shoes 63 and 64. A certain amount of the liquid at this stage will drain through the perforations 10 into the pan 11, which may be continuously drained by any suitable means (not shown). As the two band portions 60 and 61 pass beneath the compression rolls 68, 69 and 70, further quantities of liquid are squeezed out of the sewage sludge into the body of said bands and through the perforations 10.

As the bands 29 and 34 pass around the rolls 13 and 36, respectively, they are scraped by means of doctors 88 and 89 adjustably supported in brackets 90 and 91, respectively. The adjustment of said doctors 88 and 89 is provided by means or arcuate-shaped slots 92 formed in said brackets 90 and 91, the doctors 88 and 89 being mounted in holders 94 provided with set screws 96 extending through said elongated arcuate-shaped slots 92.

The partially dehydrated sludge, now called press cake, as it is scraped off of the traveling bands 29 and 34 by means of the doctors 88 and 89, contains uniformly from 82 to 85% moisture and is in a suitable condition for use locally as a fertilizer or for final processing in driers.

During the return run of the felts 29 and 34, said felts are subjected to compression in passing through the sets of squeeze rolls 27 and 28 and 38 and 39, respectively, to remove surplus liquid and put the felts again into condition to absorb further quantities of liquid. The liquid thus squeezed out of the bands 29 and 34 is accumulated in the pans 32 and 40, respectively, and may be drawn off by any suitable means. The apparatus may obviously be operated continuously to provide a continuous process of filtration and the linear speed or rate of travel of the bands 29 and 34 may be suitably regulated in accordance with the degree of dehydration desired. The chains 24 and 46 relieve the major portion of the strain upon the bands 29 and 34 and thus prevent excessive stretching due to the tension that would otherwise necessarily be put upon said bands.

In Figure 7 there is illustrated an apparatus of my invention provided with means for continuously washing and squeezing the bands of absorbent material after the solid portions of the sewage sludges have been removed by the doctors. The reference numerals 100 and 101 indicate, respectively, upper and lower traveling endless bands of absorbent material, such as felt. The bands 100 and 101 are trained around the upper and lower feed rolls 102 and 103, respectively, to pick up the sewage sludge fed between the horizontal superimposed portions of said bands by means of a hopper 104. At the delivery end of the apparatus, the solid portions of the sewage sludge are scraped from the traveling bands 100 and 101 by means of doctors 105 and 106, respectively.

The press cake removed by the doctors 105 and 106 in this form of my apparatus is delivered by the lower doctor 106 into the knit forms between a second pair of traveling bands 107 and 108, by means of which further quantities of liquid are expressed and extracted from the press cake.

After the press cake has been removed from the bands 100 and 101, said bands pass through washing devices indicated as a whole by the reference numerals 109 and 110, respectively. Each of said washing devices comprises a substantially cylindrical casing 111 having scraping elements 112 and 113 for contacting with the band as it passes into and out of said casing. Said scraping elements 112 and 113 may suitably be formed of leather or rubber, or other yielding material. Within each of the casings 109 and 110 is mounted a pair of shower pipes 114 and 115, positioned above and below the traveling bands for spraying water against the respective sides thereof to dislodge particles adhering thereto and to wash the bands. Each of said casings is further provided with an outlet 117 for draining the wash water from the casing into a pan 118.

After passing through the respective washing devices 109 and 110, said bands 100 and 101 are trained between pairs of squeeze rolls 119 and 120, respectively, whereby all excess wash water and mother liquor in the bands is removed to prepare the bands for a new cycle.

It is apparent that by washing the bands after the removal of the press cake and then squeezing them to remove excess liquids therefrom, said bands are entirely reconditioned without the necessity of setting down the apparatus, as would otherwise be the case due to clogging of the bands with sewage particles. The bands are kept constantly in an absorbent condition and free to exercise the maximum capillary attraction for the liquids in the sewage sludges being filtered.

I claim as my invention:

1. In an apparatus of the class described, a plurality of rolls, a pair of bands of absorbent material trained around said rolls with portions of said bands in superposed contacting relation, a hopper having a lower opening for feeding sewage sludge between the band portions, said hopper being curved to conform to the contour of one of said rolls and members pivotally mounted on the sides of said hopper and adapted to be held against the band onto which the sludge is fed to prevent lateral spreading of said sludge.

2. In an apparatus of the class described, a plurality of rolls, a pair of bands of absorbent material trained around said rolls with portions of said bands in superposed contacting relation, a hopper having a lower opening for feeding sewage sludge between the band portions, said hopper being curved to conform to the contour of one of said rolls and being pivoted off-center so as to hug said roll, and members pivotally mounted on the sides of said hopper and adapted to be held against the bands onto which the sludge is spread to prevent lateral spreading of said sludge.

3. In an apparatus for separating solids from sewage sludge, two continuous, absorbent belts held in superimposed position throughout a portion of their length, means for depositing sewage sludge between said belts, means for applying pressure to said belts to express liquid material from said sewage, said means comprising rollers above said superimposed portion and a stationary, perforated plate beneath said superimposed portion, whereby said superimposed portion is compressed between said rollers and said plate, and means for increasing said pressure at the superimposed edges of said belts to prevent sewage from escaping from between said belts at said edges.

EVERETTE H. MORGAN.